Aug. 21, 1945.   D. G. RENNO   2,383,417
VEHICLE BODY CONSTRUCTION
Original Filed Sept. 18, 1941   5 Sheets-Sheet 3

Inventor
D. G. Renno
By Paul O. Rippel
Atty.

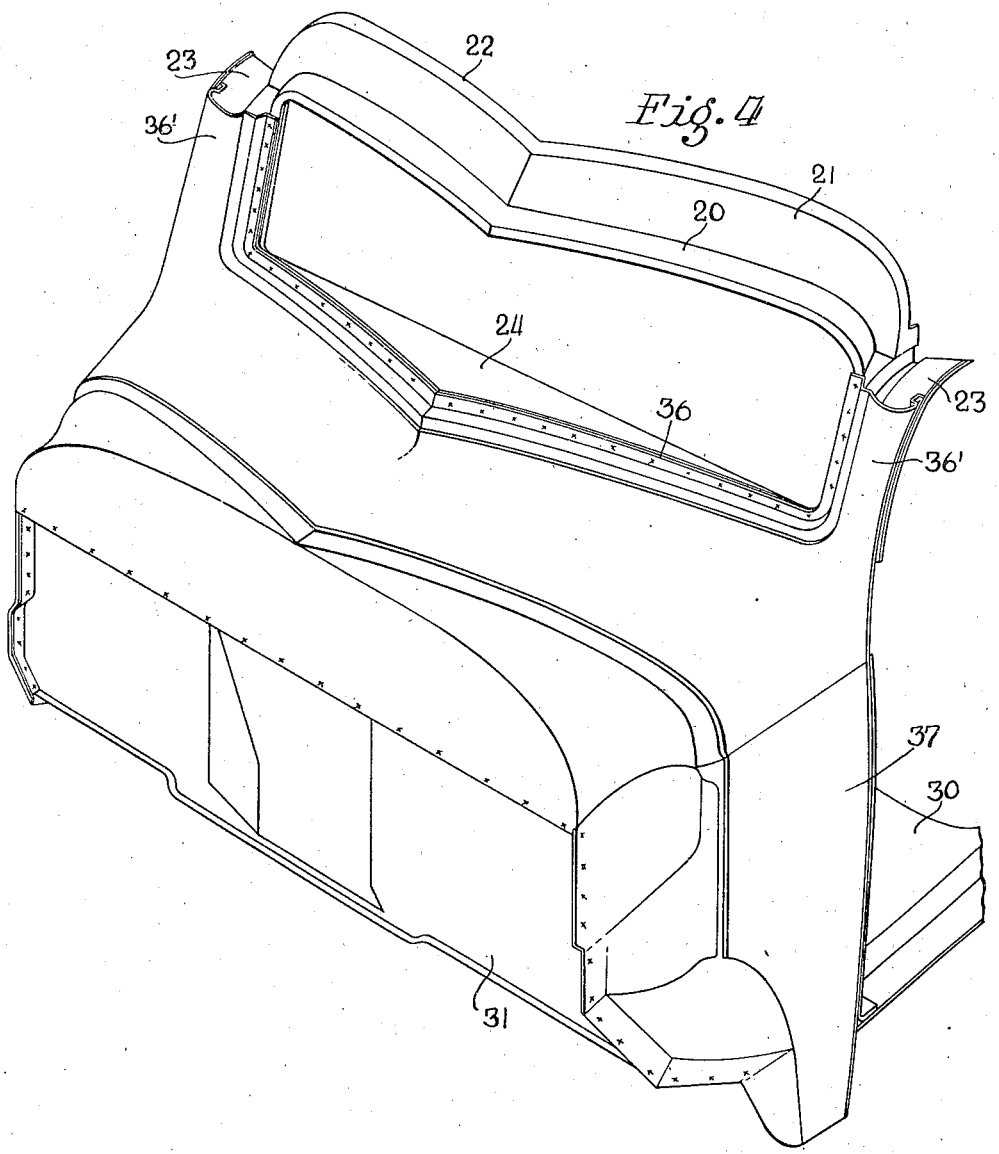

Aug. 21, 1945.   D. G. RENNO   2,383,417
VEHICLE BODY CONSTRUCTION
Original Filed Sept. 18, 1941   5 Sheets-Sheet 5
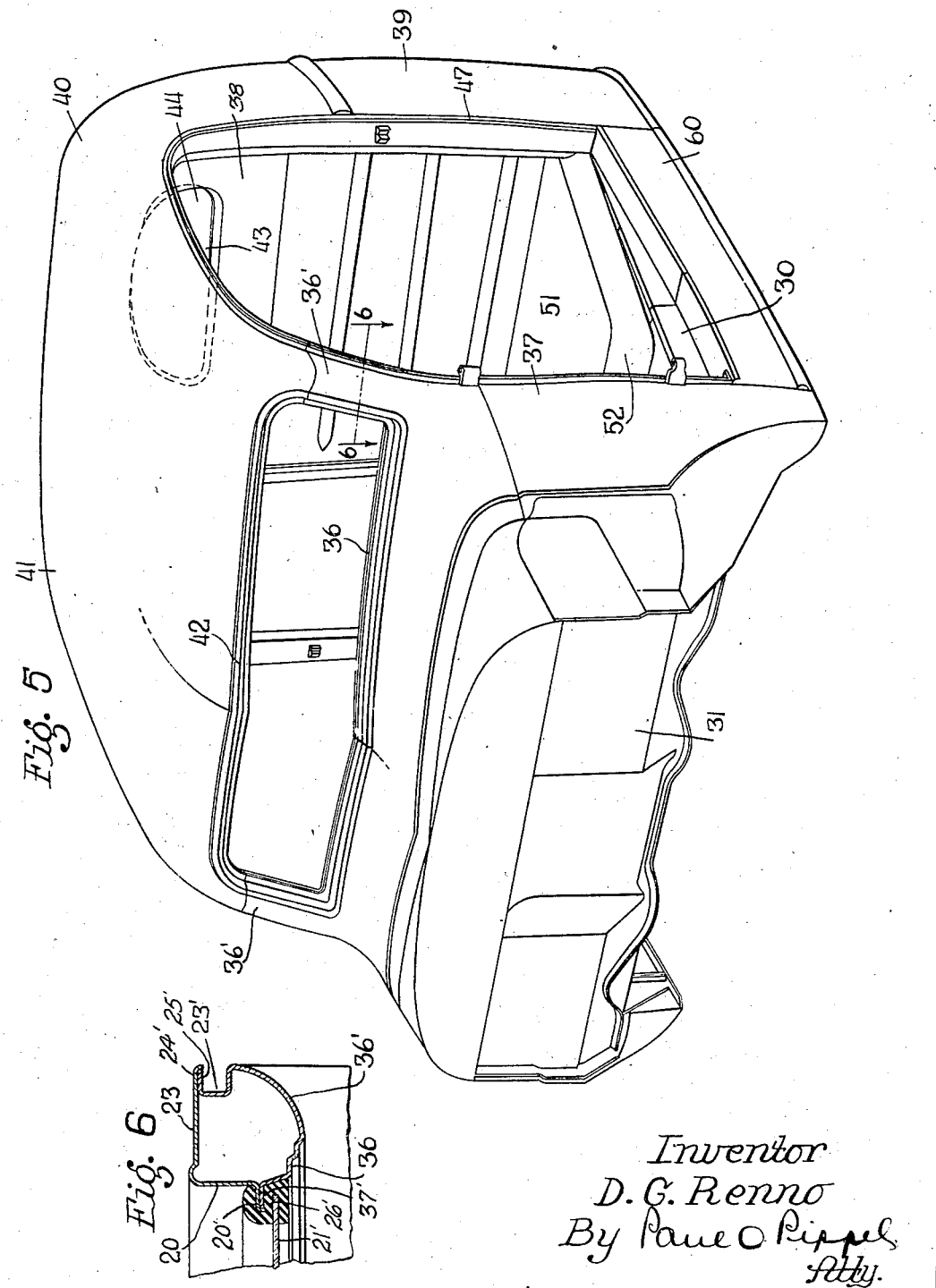
Inventor
D. G. Renno
By Paul O Pippel
Atty.

Patented Aug. 21, 1945

2,383,417

UNITED STATES PATENT OFFICE 2,383,417

VEHICLE BODY CONSTRUCTION

Donald G. Renno, New Haven, Ind., assignor to International Harvester Company, a corporation of New Jersey Original application September 18, 1941, Serial No. 411,272. Divided and this application October 8, 1942, Serial No. 461,277

2 Claims. (Cl. 296—28)

This invention relates to a metal body construction for automotive vehicles. More particularly, it relates to the formation of different units and the means by which they are assembled to form a unit body construction.

The principal object of the invention is to provide an improved cab construction with a minimum number of sections or units, a minimum amount of material, and maximum strength.

Another object is to form sheet metal parts making up a metal body in such a manner that portions are joined to form reenforcements for door pillars and other openings; also, to provide the equivalent of sills for the body and supporting means for the seat of the vehicle.

These objects and others which will be apparent are obtained by providing sections and joining them in the manner illustrated in the accompanying drawings, in which:

Figure 4 is a front three-quarter perspective view of the structure shown in Figure 2 with the outside cowl panel secured in position, as well as the front side panels;

Figure 5 is a three-quarter perspective view of the entire assembled cab structure;

Figure 6 is a detailed section taken on the line 6—6 of Figure 5; and

Figure 1:
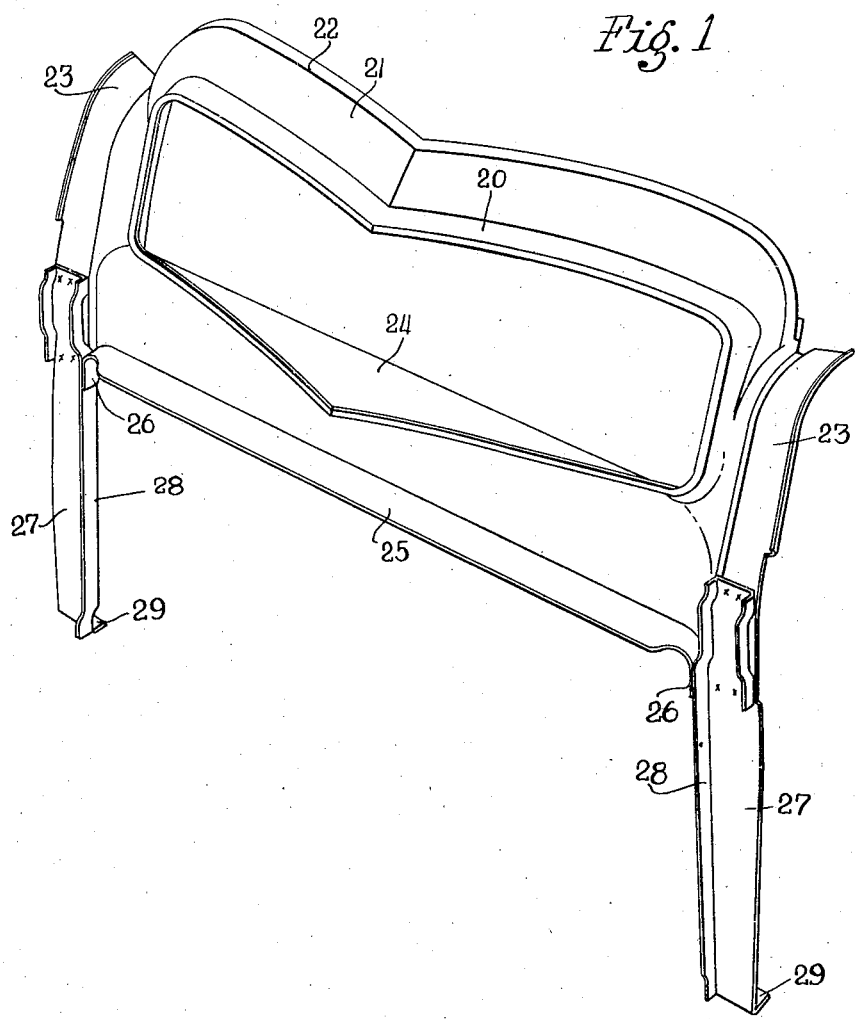
Figure 1 is a perspective view of the upper front section or unit that forms the windshield opening and the cowl and the side members which form one part of the front pillars.

The body shown in the drawings is of the unit type constructed entirely of steel and welded together primarily by resistance welding, although arc welding, gas welding, or brazing may be applied at certain junctures of the contacting members to strengthen the joints. The panels are designed to form box-like sections at locations where strength is required. The body may be considered of the frameless type, since there is no separate frame, and the body is self-supporting in that the sheet metal members provide the entire framework and support.

Referring to Figure 1, the inner front panel or unit is illustrated. This panel is provided with an out-turned flange 20 which provides the windshield opening extending completely therearound, the details of the windshield mounting having been omitted. As shown in Fig. 6 the flange 20 is provided with a short extension flange 20' which lies parallel to the plane of the windshield glass 21' extending completely around the windshield opening. An upwardly extending flange 21 above the top of the windshield opening is provided with a rearwardly turned flange 22 for connection with the top panel, to be later described. Along the sides or ends of the windshield opening, the inner front panel is formed with curved flange portions 23 terminating in portions 24', which form the upper inside portion of the door openings and cooperate with other parts of the structure, to be later described, to form the upper portion of the door pillar.

The windshield opening is shown as of the type accommodating a V-shaped windshield. At the inside of the windshield opening, an instrument panel 24 is formed and extends inwardly and downwardly and is provided at the inside lower end with a rearwardly extending flange 25. This flange is provided at each end with a down-turned extension 26 that is secured to a lower door pillar member or leg 27. This member overlaps the lower portion of the curved portions 23, and is preferably secured thereto by welding. A forwardly turned flange 28 on each member 27 provides for attachment of the extensions 26. A rearwardly bent portion 29 at the lower end of each member 27 provides means for attaching these members to a front sill member 30, as illustrated in Figures 2 and 3.

Figure 2:
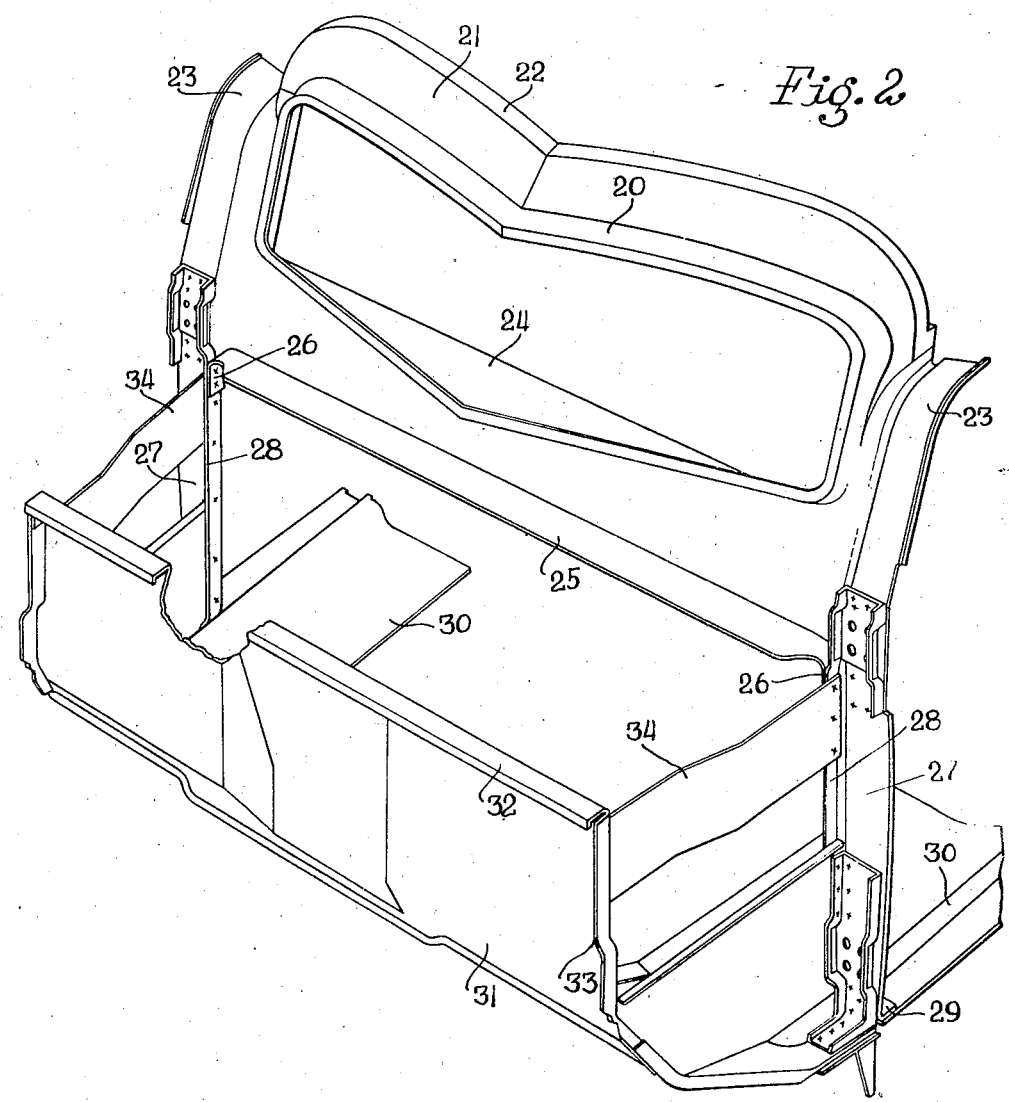
Figure 2 is a perspective view showing structure of Figure 1 installed in place with a second or dash unit and with the front frame sills secured to the dash portion.
Figure 3:
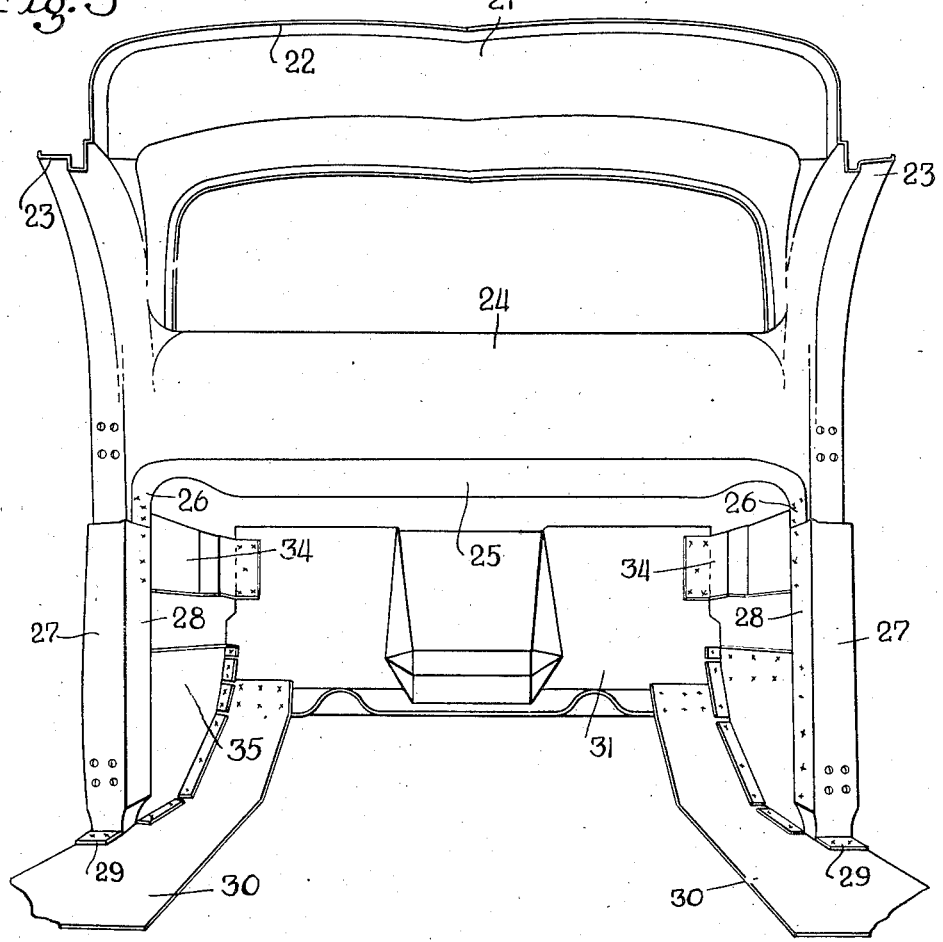
Figure 3 is a perspective view from the rear of the same structure shown in Figure 2.

Referring now to Figure 2, a second or dash unit has a substantially vertical dash panel member 31 provided with a forwardly extending flange 32 along its horizontal top portion and with forwardly extending flanges 33 at its ends. Brace members 34 are secured to the flanges 28 of the door pillar members 27 and to the ends of the panel 31. As best shown in Figure 3, lower brace members 35 are secured to the flanges 28 and extend forwardly, being secured to the front dash panel 31 and to the front sill members 30. The front sill members 30 are also extended upwardly and are welded to the inside of the dash panel member 31 near its bottom end.

Figure 4 shows a third or front cowl section or unit added to the structure of Figure 2. Said section is provided with a flange 36, as shown in Fig. 6, having an extension flange 37' mating with the flange 20' of the inside front section and secured thereto. The flanges 20' and 37' form a head over which a channeled rubber windshield retaining member 26' is fitted. Said member is also further channeled to receive the windshield glass 21'. Said cowl section also includes upright extensions 36' joining with the portions 23 to complete the upper, boxlike door pillars, as shown in Figure 6. This figure also shows the windshield glass and securing means therefor and an outwardly opening channel 23' terminating in a flange 25' for a resilient door sealing member. The flange 25' lies against and is secured to the flange portion 24' of the portion 23. At the front, the cowl section is turned downwardly and is joined to the upper portion of the front dash panel 31 along the flange 32.

At each side, a front side panel member 37 is joined to the member 27, to the horizontal end portions of the cowl member, and to the ends of the front dash panel.

Referring to Figure 5, the outside rear panel includes a rear outside back portion 38, forwardly curved corner or side portions 39, and a forwardly curved top portion 40. As shown, the top portion 40 is secured to a roof panel 41. Said panel is formed at the front opening with a flange 42 adapted to be secured to the top flange 20 above the windshield opening to complete the frame for the windshield. A rear opening 43 is formed in the upper portion of the back of the rear panel section.

The inner rear panel is adapted to fit within the rear section in spaced relation to strengthen and reenforce the rear panel. This structure is shown and claimed in my copending application, Patent No. 2,311,129, Feb. 16, 1943, of which this present application is a division. The inner rear panel section is also provided with out-turned flanges adapted to mate with flanges on the rear panel section to provide a rear door pillar 47. A seat box and rear bottom member 51 are formed with a raised portion for supporting the seat cushion of the vehicle. A panel member 60, extending from the front of the cab to the rear section, extends below the bottom of the door and connects the front and rear sections, as will presently appear.

Figure 7:
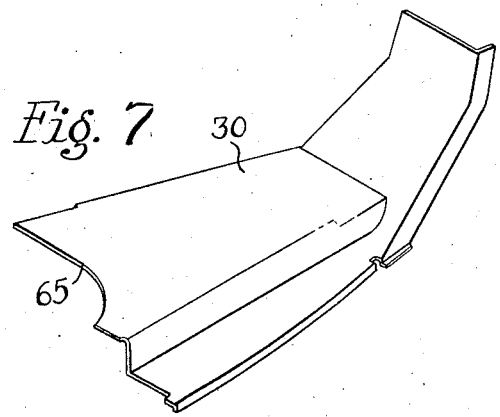
Figure 7 is a perspective view of the front sill member shown in Figure 3.

It will be noted by inspection of Figures 3, 5, and 7 that the front side sill member 30 is the same shape in cross-section as the side of the seat box 51 and has flanges and walls corresponding to the parts of this box. The rear end of the front sill member 30 overlaps the section of the seat box and is secured by welding, as described in my copending application referred to above. It will be noted that the member 30 has a curved edge 65 on its horizontal portion, which fits around a curved forward portion of the seat box 51. The lower edge of the sill 30 is secured to the member 60 to form a continuation thereof. It is to be understood that the complete details of every joint have not been shown, and it may be stated that it is customary to fill in joints where elements are closely adjacent with welding material where flanges are not provided. By the construction as above set forth, applicant has simplified the construction of a cab, utilizing a minimum number of parts with maximum strength and eliminating many of the parts heretofore utilized in the construction of all-steel cabs.

It is to be understood that applicant claims as his invention all modifications in metal body construction falling within the scope of the appended claims.

What is claimed is:

1. A front end construction for a frameless unit metal body for automotive vehicles comprising, an inner front panel having a windshield opening therein, said panel being formed with a flange extending entirely around the windshield opening, said flange having an extension flange lying parallel to the plane of the windshield glass, said inner panel having an upwardly-extending portion provided with a rearwardly-turned roof attaching flange lying in the plane of the vehicle roof, an outer front panel including a cowl portion and front pillar portions, said portions having an inturned flange extending around the ends and bottom of the windshield opening, said inturned flange being provided with an extension attaching flange lying in contact with the corresponding extension flange on the inner panel, and a roof panel having a front end portion overlapping the upper portion of the inner front panel and joined to the pillar portions of the outer front panel, said roof panel having an attaching flange mating with the corresponding portion of the inner panel extension flange around the upper portion of the windshield opening, the rearwardly-turned roof attaching flange of the inner panel being joined to the inner side of the roof panel.

2. A front end construction for a frameless unit metal body for automotive vehicles comprising, an inner front panel having a windshield opening therein, said panel being formed with a flange extending entirely around the windshield opening, said flange having a short extension flange lying parallel to the plane of the windshield glass, an outer front panel including a cowl portion and front pillar portions, said portions having an inturned flange extending around the ends and bottom of the windshield opening, said inturned flange being provided with an extension attaching flange lying in contact with the corresponding extension flange on the inner panel, a roof panel having a front end portion overlapping the upper portion of the inner front panel and joined to the pillar portions of the outer front panel, said roof panel having an attaching flange mating with the corresponding portion of the inner panel extension flange around the upper portion of the windshield opening, the pillar portions of the outer panel and the roof panel being formed with outwardly-opening channels for the insertion of door sealing material, said channels having flanges abutting corresponding flanges on the inner section for providing securing means to form box-like pillars.

DONALD G. RENNO.